(12) United States Patent
Vu

(10) Patent No.: US 11,702,272 B2
(45) Date of Patent: *Jul. 18, 2023

(54) PORTABLE THERMAL INSULATED APPARATUS

(71) Applicant: Blue Dot Rising, Inc., Long Beach, CA (US)

(72) Inventor: Lara Vu, Long Beach, CA (US)

(73) Assignee: Blue Dot Rising, Inc., Long Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,406

(22) Filed: Jan. 25, 2022

(65) Prior Publication Data

US 2022/0144530 A1 May 12, 2022

Related U.S. Application Data

(63) Continuation of application No. 16/802,648, filed on Feb. 27, 2020, now Pat. No. 11,267,642, which is a
(Continued)

(51) Int. Cl.
*B65D 81/38* (2006.01)
*F25D 3/00* (2006.01)
(Continued)

(52) U.S. Cl.
CPC ..... *B65D 81/3841* (2013.01); *A47G 19/2227* (2013.01); *A47G 19/2288* (2013.01); *B65D 51/242* (2013.01); *B65D 81/18* (2013.01); *F25D 3/00* (2013.01); *G01K 1/024* (2013.01); *G08B 21/182* (2013.01); *H04Q 9/02* (2013.01);
(Continued)

(58) Field of Classification Search
CPC .. B65D 81/3841; B65D 51/242; B65D 81/18; B65D 2203/12; A47G 19/2227; A47G 19/2288; A47G 2019/225; F25D 3/00; F25D 2303/0831; F25D 2700/16;
(Continued)

(56) References Cited

U.S. PATENT DOCUMENTS 7,287,386 B2 * 10/2007 Upadhye ................ F25B 21/04
62/62
9,801,482 B1 * 10/2017 Alexander ......... A47G 19/2288
(Continued)

*Primary Examiner* — Chico A Foxx
(74) *Attorney, Agent, or Firm* — Argus Intellectual Enterprise; Jordan Sworen; Daniel Enea

(57) ABSTRACT

A portable thermal insulated apparatus for cooling or heating items stored therein. The thermal insulated apparatus includes a container having a lid that removably secures to an open first end thereof and a reservoir unit that removably secures to an open second end. The container includes an inner tube and an outer tube forming an insulated double-wall sealed at both ends in which the lid and reservoir unit can be connected thereto. The reservoir unit removably receives a thermal unit that provides cooling or heating to the contents of the container when affixed thereto. The thermal unit is separable from the reservoir unit, such that the thermal units are interchangeable as needed. In some embodiments, the thermal unit is directly securable to the lid and the second end of the container is permanently sealed.

12 Claims, 7 Drawing Sheets

Related U.S. Application Data continuation of application No. 29/692,216, filed on May 23, 2019.

(60) Provisional application No. 62/815,446, filed on Mar. 8, 2019.

(51) Int. Cl.
| | | |
|---|---|---|
| *B65D 51/24* | (2006.01) | |
| *B65D 81/18* | (2006.01) | |
| *A47G 19/22* | (2006.01) | |
| *G08B 21/18* | (2006.01) | |
| *H04Q 9/02* | (2006.01) | |
| *G01K 1/024* | (2021.01) | |

(52) U.S. Cl.
CPC .... *A47G 2019/225* (2013.01); *B65D 2203/12* (2013.01); *F25D 2303/0831* (2013.01); *F25D 2700/16* (2013.01); *H04Q 2209/40* (2013.01)

(58) Field of Classification Search
CPC ........ G01K 1/024; G08B 21/182; H04Q 9/02; H04Q 2209/40
See application file for complete search history.

(56) References Cited

U.S. PATENT DOCUMENTS

| 10,743,708 | B2* | 8/2020 | Alexander | A47J 36/2416 |
|---|---|---|---|---|
| 2013/0059259 | A1* | 3/2013 | Oldani | A61M 5/44 |
| | | | | 220/254.1 |
| 2015/0158658 | A1* | 6/2015 | Anelevitz | B65D 81/383 |
| | | | | 220/592.24 |
| 2016/0346116 | A1* | 12/2016 | Ohmer | A61F 7/086 |
| 2018/0255966 | A1* | 9/2018 | Moore | A47J 36/2433 |
| 2018/0333007 | A1* | 11/2018 | Ganahl | A47J 41/005 |
| 2018/0334306 | A1* | 11/2018 | Choi | B65D 81/18 |
| 2018/0360264 | A1* | 12/2018 | Alexander | A47J 36/2472 |
| 2019/0145688 | A1* | 5/2019 | Tsuno | F25D 3/06 |
| | | | | 62/129 |
| 2019/0242636 | A1* | 8/2019 | Tsuno | F25D 19/006 |
| 2020/0248057 | A1* | 8/2020 | Sezukuri | A23L 3/363 |
| 2020/0367691 | A1* | 11/2020 | Alexander | A47J 41/005 |
| 2021/0139222 | A1* | 5/2021 | Gisholt | A47J 41/0005 |

* cited by examiner

PORTABLE THERMAL INSULATED APPARATUS

CROSS REFERENCE TO RELATED APPLICATION

This application claims the benefit of U.S. Nonprovisional application Ser. No. 16/802,648 filed on Feb. 27, 2020, U.S. provisional application No. 62/815,446 filed on Mar. 8, 2019, and U.S. Design Application No. 29/692,216 filed on May 23, 2019. The above identified patent applications are herein incorporated by reference in their entirety.

BACKGROUND OF THE INVENTION

The present invention relates to a portable heating and cooling apparatus. More specifically, the present invention relates to a portable thermal insulated apparatus having interchangeable heating and cooling sources for maintaining a desired temperature from liquids and solids, such as breastmilk, stored therein.

Women who breastfeed, particularly those who are on-the-go or work throughout the day, must express milk using a pump while away from her baby. In doing so, a mother needs to store milk at safe temperatures in order to ensure the safety of her milk when it is ultimately given to her baby. However, there are limited options which allow for proper cold storage and portability of breastmilk while traveling from locations or away from the home for an extended period of time. Existing portable bags allow for the addition of ice packs but are poorly insulated and therefore do not allow for safe storage of breastmilk for longer than 3-4 hours. Another challenge is that most of these bags are bulky, non-discreet, and not conveniently portable. Additionally, existing portable bags do not adequately protect glass storage bottles from breakage and only accommodate plastic bags or plastic bottles.

Another inconvenience is that existing devices that allow for short periods of cooling storage are unable to warm the same liquid or bottle within the same storage container. Furthermore, these same devices tend to focus on maintaining liquid or food that are already cold and inefficient at changing the temperature to a desired temperature. For example, after cooling breastmilk for storage, it is typically warmed before feeding the breastmilk to a baby. Unfortunately, a separate device is needed to warm milk inside bottles or bags. The presented invention not only maintains cold or warm temperature, it substantially changes the temperature of liquids, such as breastmilk, to a desired temperature. Furthermore, current devices that allow for the storage of breastmilk, such as plastic bags, are only single purposed for breastmilk and not reusable because the device either lacks convenience or lacks durability for other uses.

In light of the devices disclosed in the known art, it is submitted that the present invention substantially diverges in design elements and methods from the known art and consequently it is clear that there is a need in the art for an improvement for a portable thermal insulated apparatus. In this regard the instant invention substantially fulfills these needs.

SUMMARY OF THE INVENTION

In view of the foregoing disadvantages inherent in the known types of portable thermal insulated apparatuses now present in the known art, the present invention provides a new portable thermal insulated apparatus wherein the same can be utilized for heating and cooling liquids and solids stored therein.

It is an objective of the present invention to provide a portable thermal insulated apparatus having a container with an open first end and an open second end, wherein a lid removably secures to the first end and a reservoir unit removably secures to the second end. The container includes an inner tube and an outer forming an insulated double-wall sealed at both ends thereof. The reservoir unit removably receives a thermal unit that provides cooling or heating to the contents of the container when affixed thereto. A reservoir cap of the thermal unit forms a shelf within the container that directly receives the beverage or liquid when the reservoir unit is affixed to the container. The thermal unit is separable from the reservoir unit, such that the thermal units are interchangeable as needed. The thermal unit includes a refrigerant or phase change material, wherein a temperature difference between the phase change material and the contents of the container provide for the respective cooling or heating. The reservoir unit is removable from the thermal insulated container, wherein the thermal unit may be separately placed in a freezer to reach a desired temperature or replaced with a different thermal unit, which provides varying temperature ranges including heat.

It is another objective of the present invention to provide a portable thermal insulated apparatus having a container with an open first end and a closed second end, wherein a lid removably secures to the open first end and the thermal unit is directly secured to the lid. The container includes an inner tube and an outer forming an insulated double-wall sealed at both ends thereof. The thermal unit provides cooling or heating to the contents of the container when affixed thereto. The thermal unit is separable from the lid such that the thermal units are interchangeable as needed.

It is yet another objective of the present invention to provide a portable thermal insulated apparatus comprising a bottle for storing fluid therein, wherein the glass bottle rests along a base of the container. When the thermal unit is secured to the lid, the bottle is prevented from moving within the container because the bottle is sandwiched between the base and the thermal unit.

It is yet another objective of the present invention to provide a portable thermal insulated apparatus wherein the thermal unit includes a refrigerant or phase change material, wherein a temperature difference between the phase change material and the contents of the container provide for the respective cooling or heating. The thermal unit is removable from the thermal insulated container, wherein the thermal unit may be separately placed in a freezer to reach a desired temperature or replaced with a different thermal unit, which provides varying temperature ranges including heat. The varying temperatures of the thermal unit and the rate of heat transfer may be achieved by changing the volume of phase change material inside the thermal unit, changing the shape of the reservoir unit, or by using different phase change material capable of achieving specific temperatures for cold and heat, or other method which retains the ease of interchangeability of the thermal unit or reservoir unit as a whole.

It is yet another objective of the present invention to provide a portable thermal insulated apparatus wherein the phase change material within the thermal unit in permanently enclosed.

It is therefore an object of the present invention to provide a new and improved portable thermal insulated apparatus that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
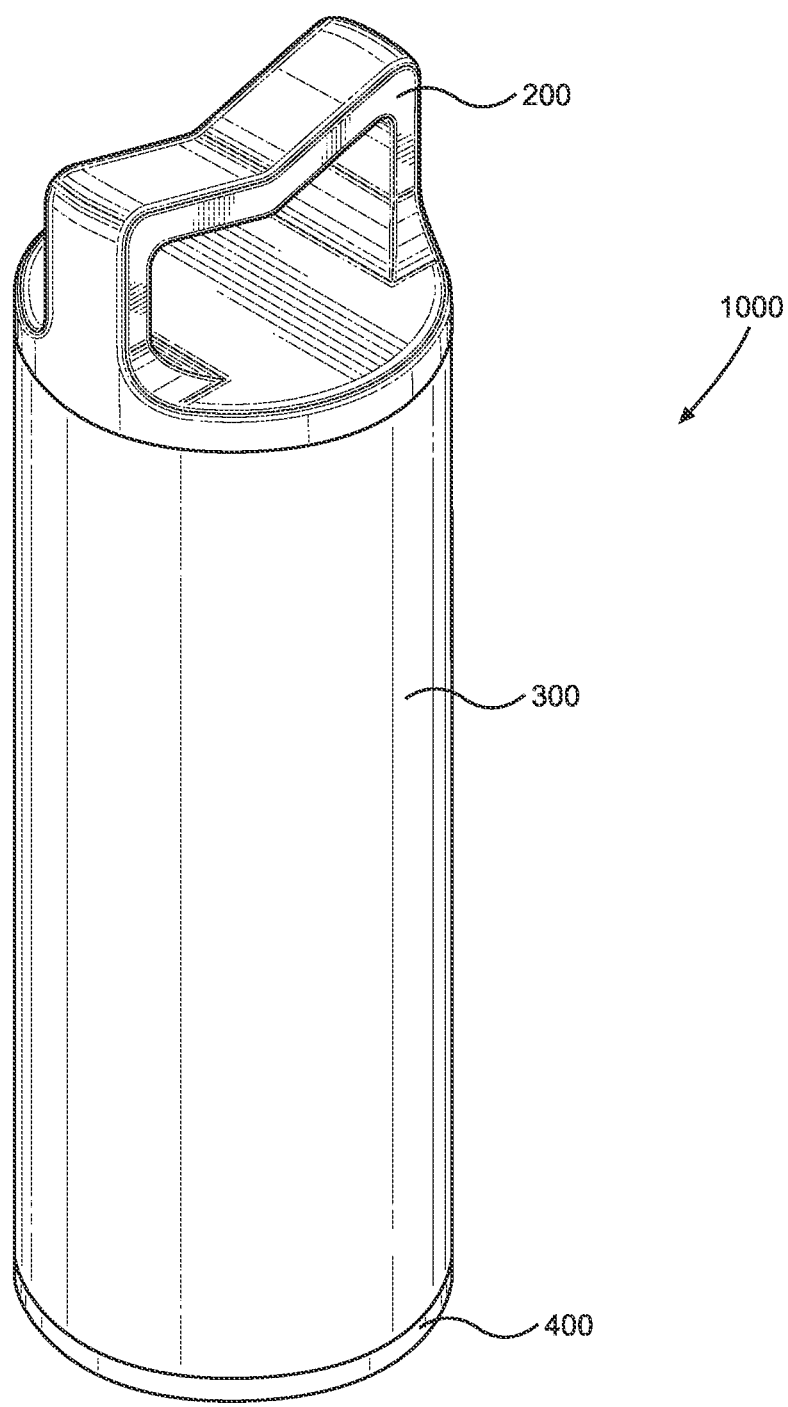
FIG. 1 shows a perspective view of an embodiment of the portable thermal insulated apparatus.

Reference is made herein to the attached drawings. Like reference numerals are used throughout the drawings to depict like or similar elements of the portable thermal insulated apparatus. For the purposes of presenting a brief and clear description of the present invention, the preferred embodiment will be discussed as used for heating and cooling liquids and solids stored therein. The figures are intended for representative purposes only and should not be considered to be limiting in any respect.

Figure 2:
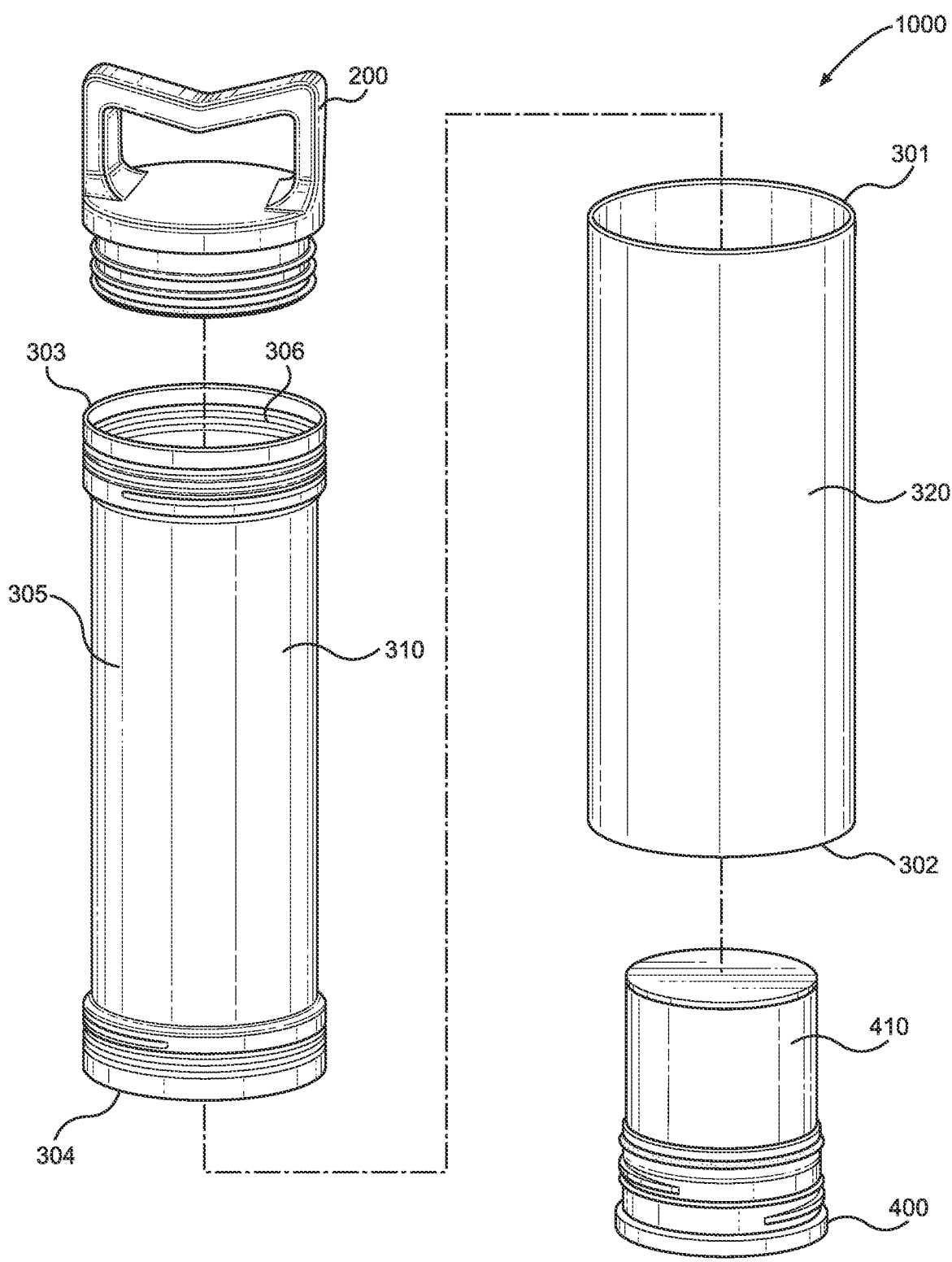
FIG. 2 shows an exploded view of an embodiment of the portable thermal insulated apparatus.

Referring now to FIGS. 1 and 2, there is shown a perspective view and an exploded view of an embodiment of the portable thermal insulated apparatus, respectively. The portable thermal insulated apparatus 1000 comprises a container 300 having a lid 200 that removably secures to an open first end 301 and a reservoir unit 400 that removably secures to an open second end 302. The reservoir unit 400 includes a plurality of interchangeable thermal units 410 each capable of maintaining a different desired temperature when affixed to the container 300. The container 300 forms a hollow interior volume that is adapted to receive food, medicine, liquids or stored liquids, such as breastmilk, through the open first end 301. The liquid can be stored in a glass bottle, plastic bag, plastic bottle, or the like. In some embodiments, the liquid is directly received within the container 300. The reservoir unit 400 is configured to achieve and maintain a safe temperature for the liquid or food stored therein over an extended period, serving as a portable refrigeration device or heating source depending on the thermal unit 410 disposed within the reservoir unit 400. The container, lid, and reservoir unit are each made of suitable, durable material, such as plastic or stainless steel. In some embodiments, the parts of the portable thermal insulated apparatus are made of different materials from one another.

The container 300 includes a coaxially aligned inner tube 310 and an outer tube 320 forming an insulated double-wall sealed at both ends 301, 302 and is configured to store fragile items therein, such as glass bottles or bags of breastmilk and prevent breakage thereof. In the illustrated embodiment, the container 300 is sized to allow a user to easily transport the portable thermal insulated apparatus 1000 between various locations when a heating source or cooling source is not readily available. In the illustrated embodiment, the portable thermal insulated apparatus 1000 is approximately 68 mm in diameter and 226.4 mm in length.

Figure 5:
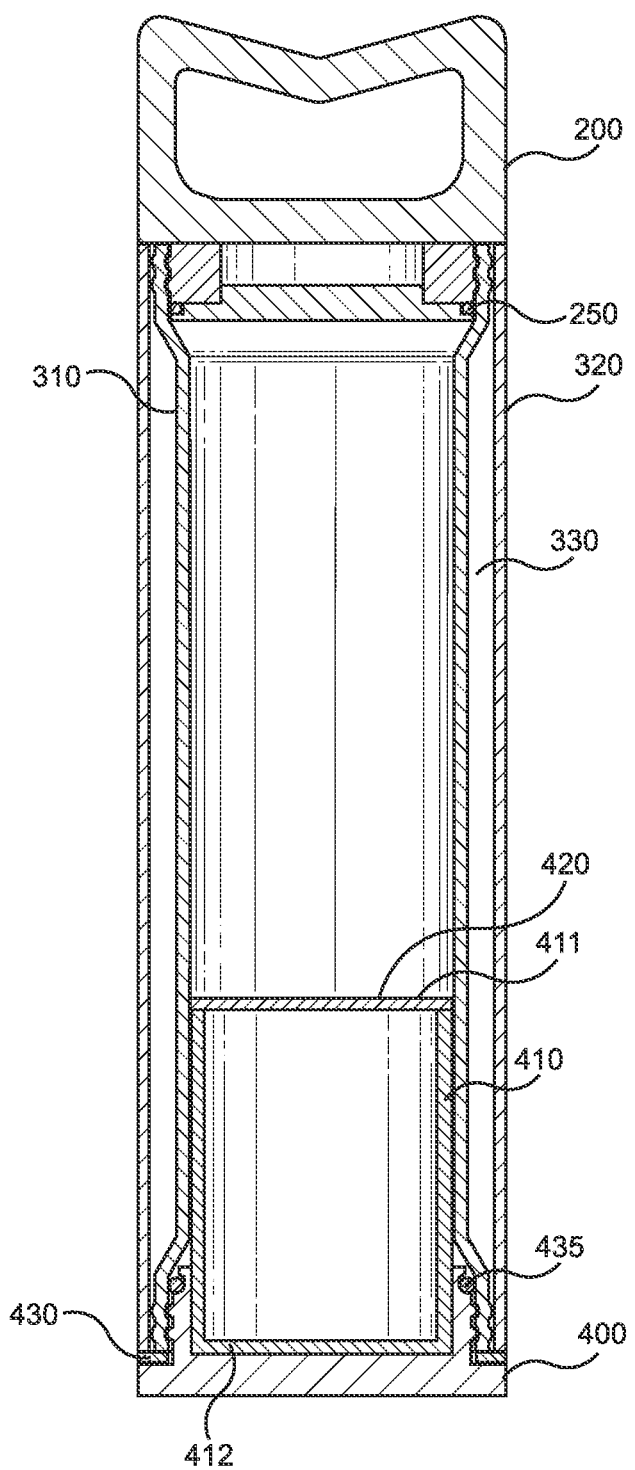
FIG. 5 shows a cross sectional view of an embodiment of the portable thermal insulated apparatus.

In the illustrated embodiment, the outer and inner tubes 310, 320 each comprise a circular cross section and are substantially equivalent distances between the first and second ends 301, 302. The outer tube 320 comprises a uniform diameter between the first and second ends 301, 302, wherein the inner tube 310 comprises a diameter smaller than the diameter of the outer tube 320 so as to fit therein and form a vacuum space therebetween (as shown in FIG. 5, 330). In the illustrated embodiment, the inner tube 310 comprises an outer diameter of 62 mm and a thickness of 0.7 mm. The outer tube 320 comprises an outer diameter of 68 mm and a thickness of 0.7 mm. The inner and outer tube 310, 320 are secured to one another by any suitable fastener, such as welding. In other embodiments, the inner and outer tube form a seal and insulation therebetween through any suitable means of vacuum sealing. In the illustrated embodiment, the interior of the container is insulated via the vacuum space formed between the entire sidewalls of the inner and outer tubes 310, 320. However, in alternated embodiments, the thermal insulation of the apparatus is achieved by using insulating material, such as thermal insulation foam.

An upper end 303 and lower end 304 of the inner tube 310 each comprise a fastener 306 in which the lid 200 and reservoir unit 400 can be removably connected thereto, respectively. In the illustrated embodiment, the fastener 306 is threading disposed on the interior of the inner tube 310. The upper and lower ends 303, 304 protrude outward from a middle section 305 disposed therebetween and rest against the interior of the outer tube 320. In alternate embodiments, the lid and reservoir unit can be secured to the upper and lower ends 303, 304 through any suitable fastening or sealing mechanism, such as a press fit or a mating female/male fastener.

Figure 3:
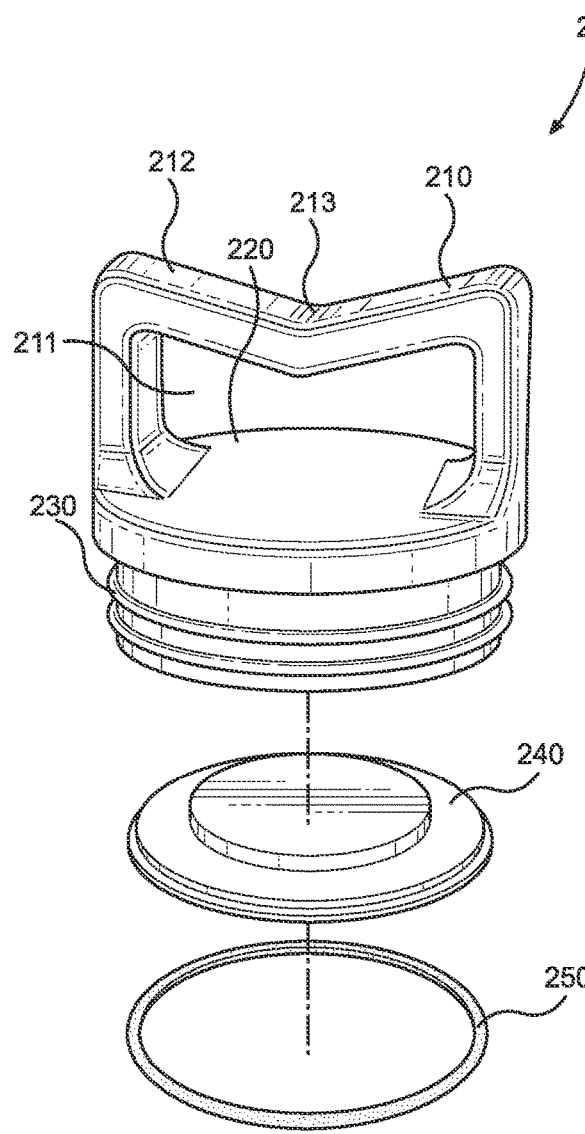
FIG. 3 shows an exploded view of an embodiment of the lid of the portable thermal insulated apparatus.

Referring now to FIG. 3, there is shown an exploded view of an embodiment of the lid of the portable thermal insulated apparatus. The lid 200 of the portable thermal insulated apparatus removably covers the open first end 301 of the container (as seen in FIG. 2). A handle 210 extends upward from an upper side 220 of the lid 200 so as to allow a user to ergonomically and conveniently grasp the apparatus when closing, opening, or transporting the portable thermal insulated apparatus.

In the illustrated embodiment, the handle 210 is integral with the upper side 220 and forms an opening 211 between an upper portion 212 of the handle 210 and the upper side 220 of the lid 200 in order to receive fingers of the user. The upper section 212 of the handle 210 includes a cross member that extends between a pair of vertical members, wherein the pair of vertical members extend from the upper side 220 on a perimeter edge of the lid 200 and on opposing sides thereof. The upper portion 212 tapers towards the upper side 220 at a middle portion 213 to allow the palm of a hand to comfortably rest within the opening 211. In alternate embodiments, the handle 210 comprises any suitable shape, wherein some embodiments, the lid does not include a handle.

In the illustrated embodiment, a lid fastener 230 extends from a lower side of the lid opposite the upper section 220 of the lid 200, and is configured to removably secure to the fastener on the upper end of the inner tube. In the illustrated embodiment, the lid fastener 230 is threading disposed on the exterior thereof and adapted to threadedly engage onto the interior threading of the upper end fastener of the inner tube. In alternate embodiments, the lid fastener is any fastener configured to removably secure to the fastener on the upper end of the inner tube.

A seal is formed via a gasket 250 that is positioned about the lid fastener 230, such that when the lid is secured to the container the material of the lid does not rub against the material of the container, preventing damage thereto. In the illustrated embodiment, an insulated panel 240 affixes to the lid fastener 230 and is configured to prevent temperature loss through the upper end of the container when the lid is secured thereto. The insulated panel 240 comprises a circular base having a protrusion extending into a space formed by the lid fastener 230. In the shown embodiment, the insulated panel 240 partially extends into the space formed by the lid fastener 230, thereby leaving some space unoccupied. In the illustrated embodiment, the insulated panel 240 is composed of stainless steel. In the illustrated embodiment, the insulated panel is affixed to the lid fastener and extends thereover, wherein the insulated panel partially extends into the space formed by the lid fastener and leaving a portion of the space void such that the insulated panel is configured to prevent temperature loss from the interior of the container when the lid is secured thereto.

Figure 4:
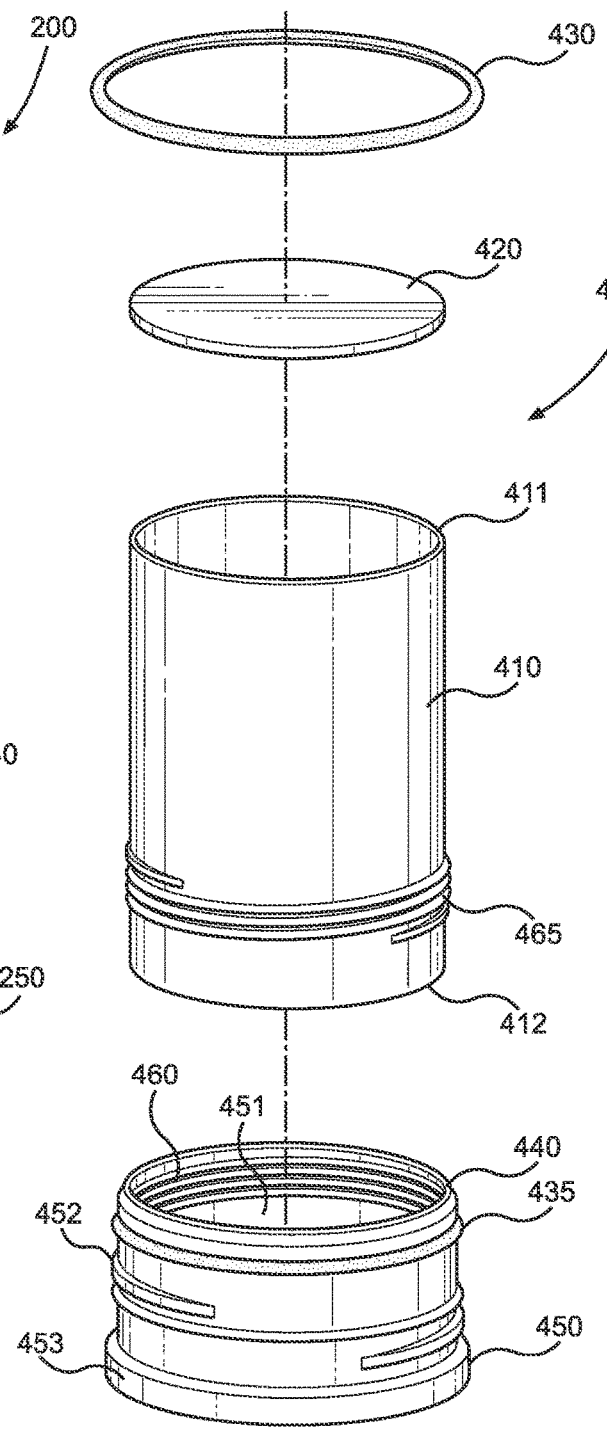
FIG. 4 shows an exploded view of an embodiment of the reservoir unit of the portable thermal insulated apparatus.

Referring now to FIG. 4, there is shown an exploded view of one embodiment of the reservoir unit of the portable thermal insulated apparatus. The reservoir unit 400 removably receives a thermal unit 410 that is removably disposed within a recess 451 of a base 450 of the reservoir unit 400. In some embodiments, a lower end of the thermal unit 410 is removably secured to the base 450 via a fastener. In the illustrated embodiment, the thermal unit 410 comprises threaded fastener 465 disposed on an exterior thereof configured to removably secure to a mating threaded fastener 460 on an interior wall of the base 450. In this way, the thermal unit 410 is secured to the base 460 in order to prevent any excess movement or jostling when a user is transporting the portable thermal insulated apparatus between locations.

The base 450 comprises a flat lower section and forms the lowermost portion of the portable thermal insulated apparatus so as to allow the apparatus to remain in an upright configuration when placed on a flat surface, such as a table. In the illustrated embodiment, a sidewall 440, surrounding the recess 451, includes a reservoir fastener 452 configured to removably secure the reservoir unit 400 to the container 300. In the illustrated embodiment, the reservoir fastener 452 is threading disposed on an exterior of the sidewall 440 and is adapted to threadedly engage onto the interior threading of the lower end fastener of the inner tube. In one embodiment, the threaded fasteners 230, 452 require opposite rotation for engaging and disengaging with the container 300, respectively. For example, the threaded fasteners 230 requires clockwise rotation for unsecuring the lid 200 from the container 300, and threaded fastener 452 requires counterclockwise rotation for unsecuring of the reservoir unit 400. In this way, the lid 200 and the reservoir unit 400 cannot be simultaneously unsecured from the container 300 by a single relative rotation of one of either the lid 200 or the reservoir unit 400.

In the illustrated embodiment, a shoulder 453 extends annularly about the reservoir unit, having a larger diameter than the sidewall 440, extends entirely around the base 450. When the reservoir unit 400 is secured to the container, the sidewall 440 rests entirely within the container and the shoulder 453 abuts the edge of the container so as to form an exterior portion of the portable thermal insulated apparatus (configuration seen in FIG. 1). In some embodiments, a seal is formed between the shoulder 453 and the container via a first reservoir gasket 430 disposed on the shoulder 453, below the reservoir fastener 452 (as seen in FIG. 5). The first reservoir gasket 430 is configured to prevent the container from rubbing against the base 450, which can cause damage to the materials of after repeatedly securing and unsecuring the reservoir unit 400 from the container. In the illustrated embodiment, a second reservoir gasket 435 is disposed above the reservoir fastener 452 and configured to form a seal with the container when the reservoir unit 400 is attached thereto. The second reservoir gasket 435 is configured to prevent any contents stored within the container from leaking therebeyond.

In the illustrated embodiment, the thermal unit 410 is interchangeable with a substantially similar any other thermal unit. In this way, each thermal unit 410 is configured to maintain a desired temperature. Each thermal unit 410 may provide a different cooling or heating affect to the contents of the container when affixed thereto. The design of the portable thermal insulated apparatus allows for the thermal unit 410 to be removed from the reservoir unit 400, such that the thermal units 410 are interchangeable as needed. In some embodiments, the thermal unit can be separately placed in a freezer to achieve a frozen temperature or replaced with a different thermal unit, which provides varying temperature ranges including heat. In some embodiments, a thermal unit 410 is microwavable, whereas other thermal units are constructed for cold temperatures, such as when placed in a freezer. The thermal unit is designed to keep liquid or solid at a desired temperature when disposed directly in the container, as well.

In the illustrated embodiment, the thermal unit 410 is a cylindrical tube closed on both ends. A refrigerant or phase change material is disposed within an interior of the thermal unit 410, wherein a temperature difference between the phase change material and the contents of the container provides for the respective cooling or heating. The phase change material at least partially occupies each thermal unit 410 and regeneratively absorbs thermal energy from either the warm or cold liquid to warm or cool the liquid, respectively, and then releases the thermal energy back to the liquid to maintain the temperature of the liquid. In one embodiment, the phase change material is preselected for phase changing at a desired temperature.

In the illustrated embodiment, the cylindrical tube is composed of a food-grade stainless steel or other food grade material so as to allow food or liquid to have direct contact therewith without causing harm to a user during consumption. The varying temperatures of the thermal unit is achieved by changing the volume of phase change material inside the reservoir, changing the shape of the reservoir, or by using different phase change material capable of achieving specific temperatures for cold and heat, or other method which retains the ease of interchangeability of the thermal unit 410 or reservoir unit 400 as a whole. In the illustrated embodiment, a first thermal unit is adapted to lower the temperature of breastmilk (which starts close to body temperature (approximately 34 degree Celsius) to temperatures below 10 degrees, acting as a portable refrigeration device. A second thermal unit can then raise the temperature of the stored breastmilk to body temperature for feeding to a baby.

Each thermal unit 410 includes an upper end 411 and lower end 412, wherein the lower end 412 rests flush against the bottom interior surface of the base 450. In the shown embodiment, the lower end 412 is closed. The upper end 411 is enclosed via reservoir cap 420 permanently secured to the body of the thermal unit 410. In some embodiments, the thermal unit is permanently sealed once the phase change material is disposed therein. In other embodiments, the reservoir cap 420 is removable thus allowing the phase change material to be refilled or replaced as needed. In the illustrated embodiment, the thermal unit 410 including the reservoir cap 420 comprises an outer diameter of 55 mm and a thickness of 0.7 mm.

Referring now to FIG. 5, there is shown a cross sectional view of an embodiment of the portable thermal insulated apparatus. When the reservoir unit 400 is secured to the container 300, the reservoir cap 420 of the thermal unit 400 forms a shelf within the container that directly receives the beverage or liquid thereon. In the shown embodiment, the thermal unit 410 rest within the container 300, positioned flush with the inner tube 310 and seated within the reservoir unit 400. In this way, the configuration of having the thermal unit 400 positioned at the base of an apparatus allows for more efficient and direct heating or cooling of the item placed thereon. Further, the beverage or liquid can be removed not only from the open upper end of the container, but also the open lower end when the reservoir unit 400 is detached from the container 300. In the illustrated embodiment, the thermal unit 400 encompasses approximately ⅓ of the total volume of the inner tube 310. The interchangeability of the thermal unit 410 allows varying degrees of heating and cooling using the same thermal insulated apparatus.

The portable thermal insulated apparatus is configured to hold any type of liquid such as consumable beverages and food or any portable sized container filled with liquid or food, such as alcohol or infant food. The diameter and shape of the apparatus is configured to fit different volumes of liquid or perishable goods, including medicine such as vaccines. The removability of the reservoir unit and the interchangeability of the thermal units provide multi-functional uses of a single thermal apparatus for both heating and cooling items stored therein for a substantial period of time.

Figure 6:
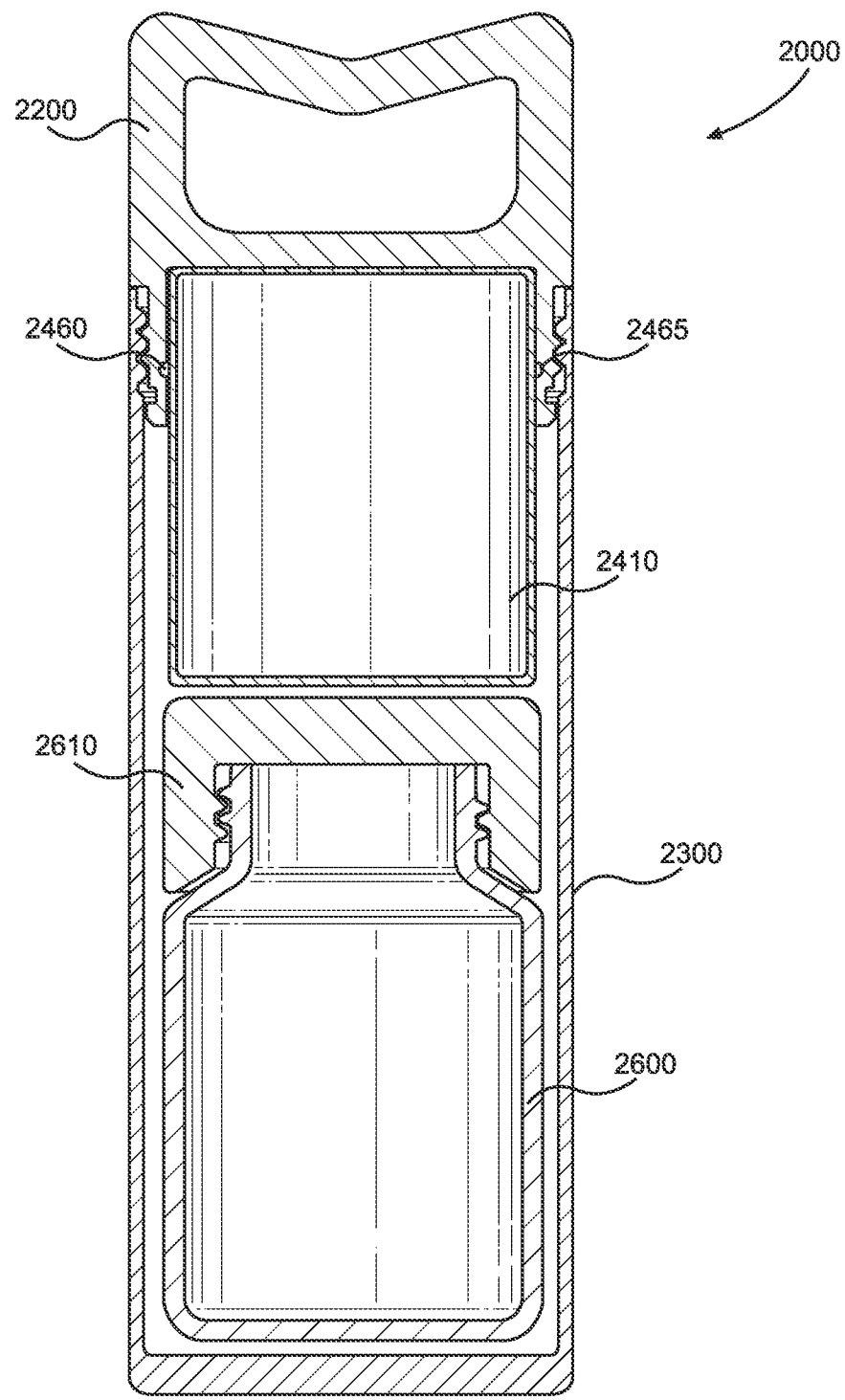
FIG. 6 shows a cross sectional view of an alternate embodiment of the portable thermal insulated apparatus.

Referring now to FIG. 6, there is shown an alternate embodiment of the portable thermal insulated apparatus. In an alternate embodiment, the thermal unit 2410 is removably secured to the lid 2200 of the portable thermal insulated apparatus 2000 via a fastener. In the illustrated embodiment, the fastener comprises a threaded fastener 2465 disposed on an exterior side of the thermal unit 2410 and a mating threaded fastener 2460 disposed on an interior wall of the lid 2200. In other embodiments, any suitable fastener can be used to removably secure the thermal unit to the lid. In this way, when a user separates the lid from the container 2300, the thermal unit 2410 will be removed along with the lid 2200.

In the illustrated alternate embodiment, the container 2300 comprises an open upper end removably covered by the lid 2200 and an interior volume defined by a sidewall and a base. In the shown embodiment, the base and sidewall are nondetachable from one another. In alternate embodiments, the base is detachable from the remaining portion of the container 2300 as shown in FIG. 2. In some embodiments, the thermal unit 410 is attachable to either the lid or the base via the threaded fastener 2465. In alternate embodiments, a first thermal unit 410 is attachable to the lid and a second thermal unit is attachable to the base.

In the illustrated embodiment, the portable thermal insulated apparatus 2000 comprises a fluid storage bottle 2600 configured to hold fluid, such as breastmilk. The fluid storage bottle 2600 comprises a bottle cap 2610 configured to removably cover an opening of the bottle 2600. In some embodiments, an upper surface of the bottle cap 2610 is flat and configured to serve as a support shelf for the thermal unit 2410, if needed. In the shown embodiment, the thermal unit 2410 remains suspended within the container and above the fluid storage bottle. The fluid storage bottle 2600 is configured to rest on the bottom of the container 2300 when disposed therein. In operation, a user unscrews the lid from the container. The user simultaneously removes both the lid and the thermal unit attached thereto. The fluid storage bottle 2600 is accessible to the user once the lid and thermal unit are separated from the container. The fluid storage bottle 2600 may then be accessed to fill with fluid needed at a later time or may be accessed for use of the fluid already stored within the bottle. In some embodiments, the portable thermal insulated apparatus 2000 does not include the fluid storage bottle 2600 and the user is free to insert other fluid directly into the interior volume of the container 2300.

In the illustrated embodiment, in an use configuration wherein the thermal unit is secured to the lid and the lid is secured to the container, a bottom surface of the thermal unit is in close tolerance to the upper surface of the bottle cap. Close tolerance is defined as the surfaces contacting each other to being a distance of up to three (3) centimeters apart from one another. The close tolerance prevents the fluid storage bottle from excess movement when a user is transporting the portable thermal insulated apparatus.

Figure 7A:
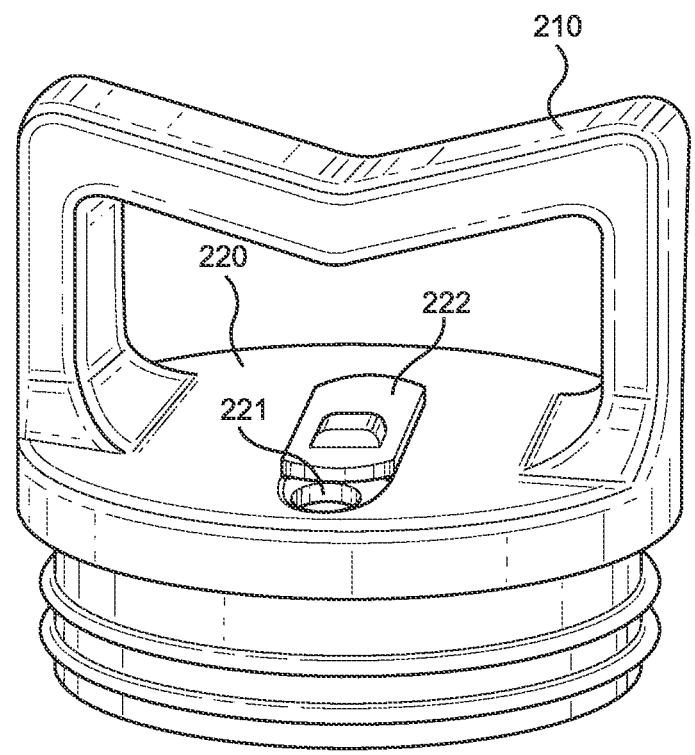
FIG. 7A shows a perspective view of a lid of an embodiment of the portable thermal insulated apparatus.
Figure 7B:
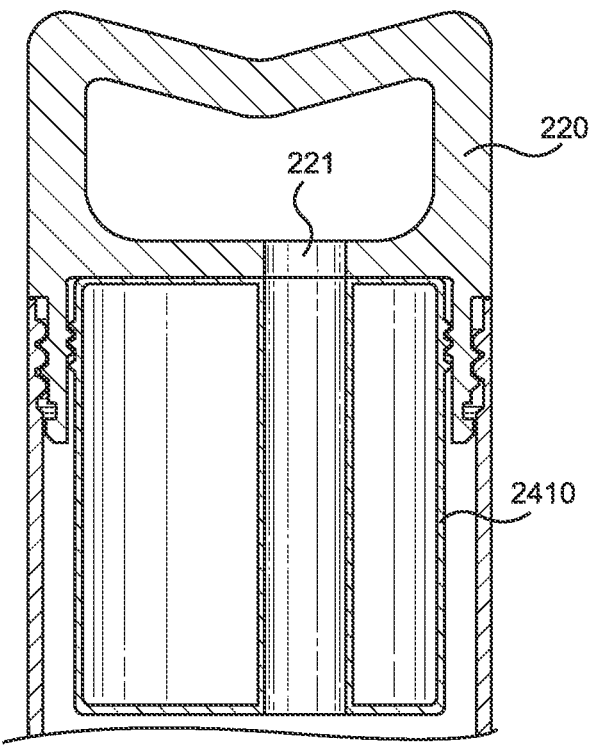
FIG. 7B shows a cross sectional view of an upper end of an alternate embodiment of the portable thermal insulated apparatus, wherein the lid comprises an opening.

Referring now to FIGS. 7A and 7B, there is shown a perspective view of a lid of the portable thermal insulated apparatus and a cross sectional view of an upper end of an alternate embodiment of the portable thermal insulated apparatus, wherein the lid comprises a lid aperture, respectively. In the illustrated embodiment, the lid comprises a lid aperture 221 configured to allow fluid from within the container to flow therethrough. In some embodiments the lid aperture 221 is circular and sized to receive a straw, whereas the lid aperture in other embodiments is shaped in any suitable manner such as to rest comfortably against a user's lips to allow a user to drink directly from the portable thermal insulated apparatus.

Now referring to FIG. 7A, the lid aperture 221 is offset from the center of the upper surface 220 to prevent any obstruction from the handle 210 while drinking directly from therefrom or through a straw. A valve 222 removably covers the lid aperture 221 to prevent temperature change within the container when the lid aperture 221 is not in use. In the shown embodiment, the valve 222 is a sliding tab adapted to slidably cover and uncover the opening 221. In alternate embodiments, any suitable valve is used such as a pop-up valve, a valve pivotally secured over the lid aperture, and the like.

Now referring to FIG. 7B, in some embodiments wherein a thermal unit is attachable to the lid, a channel extends through the thermal unit 2410. The channel is adapted to align with the lid aperture 221 (as shown) when the thermal unit is fully secured to the lid. In this way, the lid aperture is coaxial with the channel so a straw can be placed through the lid and into the container without bending. The channel is open on each end and offset from a center of the thermal unit, similar to the lid aperture 221. The thermal unit 2410 is also configured to maintain the temperature of the fluid passing through the channel for consumption. The thermal unit is fully secured to the lid when the mating fasteners are completely threaded within one another. In alternate embodiments, indicia is disposed along portions of the lid and thermal unit to indicate to a user that the channel and lid aperture is aligned.

Figure 8:
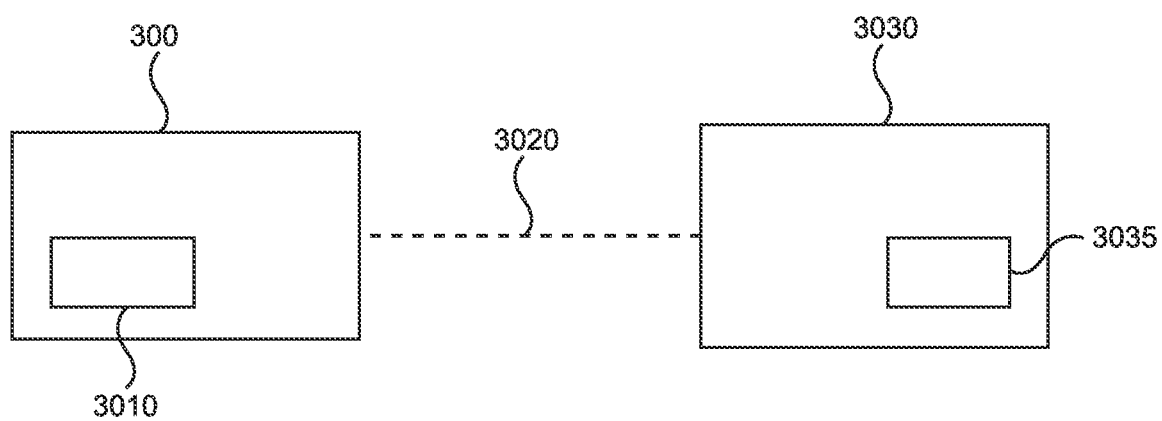
FIG. 8 shows a block diagram of a control circuit of an embodiment of the portable thermal insulated apparatus.

Now referring to FIG. 8, there is shown a block diagram of a control circuit of an embodiment of the portable thermal insulated apparatus. In some embodiments, the portable thermal insulated apparatus 1000, 2000 comprises a temperature sensor disposed within the interior of the container 300. The temperature sensor 3010 is operably connected to a transmitter that wirelessly transmits 3020 the temperature is an electronic device 3030. An application 3035 on the electronic device 3030 is configured to notify a user of the temperature measured by the sensor. In alternate embodiments, the portable thermal insulated apparatus comprises an alert feature configured to send an alert to the electronic device or 3030 or the application 3035 if the temperature falls outside of a desired threshold temperature range. In some embodiments, the alert is a message that scrolls across a display of the electronic device or an audible alarm, or both. In some embodiments, a user can set the threshold temperature range either directly on the sensor or from the application on the electronic device, depending on the fluid to be stored within the container. For example, if breastmilk is stored within the container, the threshold temperature can be set to alert a user of the temperature within the container is measured above 12 degrees Celsius.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable thermal insulated apparatus, comprising:
   a container having an open first end and an open second end forming an interior;
   a reservoir unit configured to removably secure to the open second end of the container thereby forming a sealed bottom;
   the reservoir unit configured to receive a thermal unit;
   the thermal unit configured to maintain the interior of the container at a desired temperature, wherein the thermal unit is configured to be removably secured to the reservoir unit to allow the thermal unit to be readily separated from the reservoir unit;
   wherein the thermal unit includes an upper end forming a shelf within the container adapted to directly receive a stored item thereon when the reservoir unit is secured to the second end of the container.

2. The portable thermal insulated apparatus of claim 1, further comprising a lid configured to removably cover the open first end of the container, wherein the lid comprises a lid aperture adapted to allow fluid to pass therethrough.

3. The portable thermal insulated apparatus of claim 2, wherein the lid comprises a handle disposed on an upper side of the lid forming an opening between an upper portion of the handle and the upper side of the lid, wherein the upper portion of the handle includes a cross member that extends between a pair of vertical members, the pair of vertical members extending from the upper side of the lid on a perimeter edge of the lid and on opposing sides thereof, wherein the cross member angles towards the upper side at a middle portion of the cross member.

4. The portable thermal insulated apparatus of claim 1, wherein the container comprises an inner tube and an outer tube coaxially aligned and secured to one another having a vacuum space therebetween, wherein the vacuum space extends between the open first end and the open second end of the container.

5. The portable thermal insulated apparatus of claim 4, wherein the inner tube comprises a fastener for removably securing the reservoir unit thereto.

6. The portable thermal insulated apparatus of claim 4, wherein an upper end and lower end of the inner tube protrude radially outward and rest along an interior of the outer tube when secured to one another.

7. The portable thermal insulated apparatus of claim 4, wherein the reservoir unit comprises a centrally disposed recess formed by a sidewall extending annularly about a base, the recess is configured to receive the thermal unit therein.

8. The portable thermal insulated apparatus of claim 7, wherein the sidewall includes a reservoir fastener disposed on an exterior side thereof, wherein the reservoir fastener is configured to threadedly secure to the container and form a seal therewith.

9. The portable thermal insulated apparatus of claim 7, wherein the reservoir unit comprises a shoulder extending annularly around the sidewall and on a same plane as the base, wherein the shoulder and base forms a part of an exterior side of the portable thermal insulated apparatus.

10. The portable thermal insulated apparatus of claim 9, wherein the sidewall is entirely disposed within the container when the reservoir unit is affixed thereto.

11. The portable thermal insulated apparatus of claim 1, wherein the thermal unit comprises a phase change material disposed therein and adapted to transition from a first state to a second state, wherein thermal energy is exothermic or endothermic.

12. The portable thermal insulated apparatus of claim 1, wherein the thermal unit is inaccessible when the reservoir unit is secured to the second end of the container.

\* \* \* \* \*